Nov. 18, 1952 C. K. EILERTS Re. 23,583

APPARATUS FOR USE IN THE TREATMENT OF OIL, GAS, AND GAS CONDESATE WELLS

Original Filed May 14, 1947

INVENTOR
CHARLES KENNETH EILERTS
BY H. L. Godfrey
ATTORNEY

Reissued Nov. 18, 1952

Re. 23,583

UNITED STATES PATENT OFFICE 23,583

APPARATUS FOR USE IN THE TREATMENT OF OIL, GAS, AND GAS CONDENSATE WELLS

Charles Kenneth Eilerts, Bartlesville, Okla., assignor to the United States of America as represented by the Secretary of the Interior Original No. 2,588,369, dated March 11, 1952, Serial No. 747,990, May 14, 1947. Application for reissue June 26, 1952, Serial No. 295,849

2 Claims. (Cl. 166—14)

(Granted under the act of March 3, 1883, as amended April 30, 1928; 370 O. G. 757)

Matter enclosed in heavy brackets [ ] appears in the original patent but forms no part of this reissue specification; matter printed in italics indicates the additions made by reissue.

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to the treatment of wells, it particularly relates to apparatus for the introduction of reagents into the flow string of wells and maintaining well productivity during treatment.

The equipment at a normally completed well for the recovery of fluid hydrocarbons may be thought of as comprising a casing, a christmas tree, and tubing. The casing is a steel cylinder extending from the surface to the producing zone and serving, among other purposes, to keep the earth from caving and filling the borehole. The christmas tree is an assembly of pipe fittings attached to the casing at the surface and used for controlling the production from the well. The tubing is a steel cylinder, of a smaller diameter than the casing, attached to the christmas tree and suspended inside the casing.

In these normally completed wells the tubing usually reaches to about the same depth as the casing and generally serves as an eductor of the fluid flowing from the well. The annular space between the tubing and the casing is substantially unobstructed, and at the surface, liquid may be injected into the annular space through the casing head and permitted to fall to the bottom of the well. Then it can enter the tubing inlet and flow to the surface with the well fluid being produced.

It may be necessary to inject reagents into the wells for various reasons such as corrosion control reagents, emulsion breaking reagents, acidizing reagents, and the like. The injected liquid, for example, an inhibitor, can thus distribute itself over the inner wall of the full length tubing and thus protect the steel surfaces so contacted against corrosion. The tubing of wells completed with the annular space substantially unobstructed can be treated readily with such reagents by injecting the reagent into the casing head so that it falls to the tubing inlet through the annular space between the casing and tubing.

Recent practice, particularly in wells drilled in a gas-condensate field, has been to complete the well so that fluid can be withdrawn through separate eductor tubes from any one of a plurality of producing zones which are at different depths. Wells for recovering fluids from two zones are known as dual completions; and those for recovering from three zones are termed triple completions. In such plural completion wells, devices known as "packers" are used in the annular spaces between the concentric ducts through which the hydrocarbons can be produced.

Figure 1:
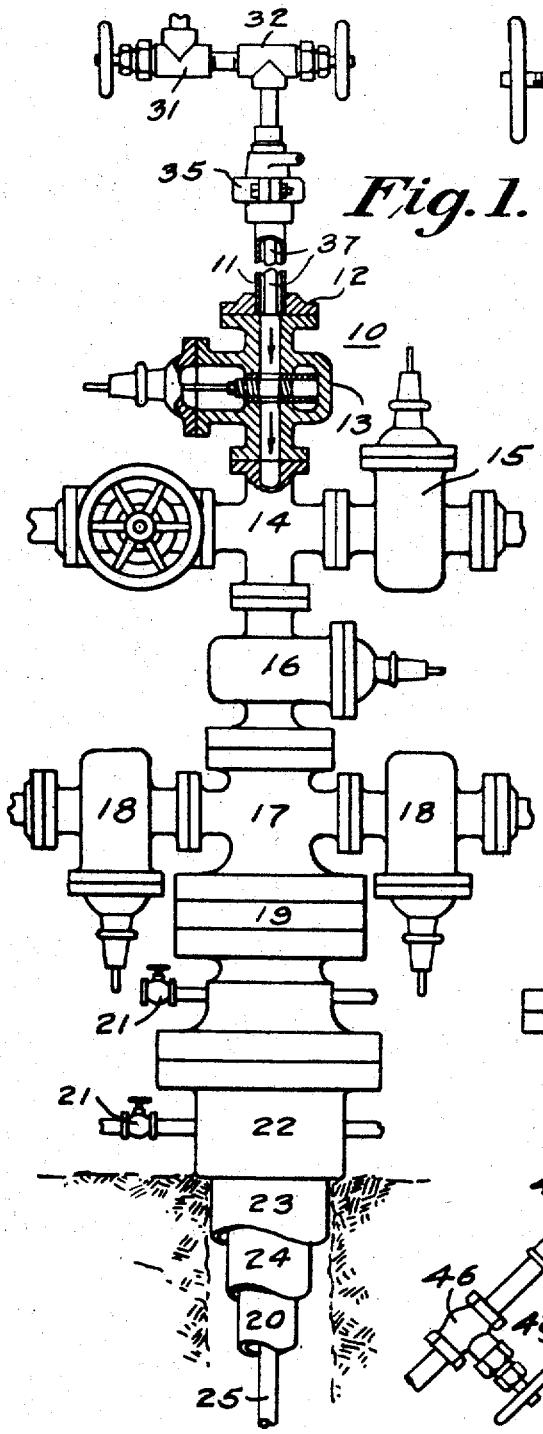
Figure 1 is an elevation, partly in section, of a christmas tree of a typical plural completion well to which one embodiment of my novel attachment is operatively connected.

In Figure 1, there is shown a christmas tree assembly 10 having a flanged conduit to which a well head magazine 11 is coaxially secured by a companion flange 12 of the magazine. The christmas tree includes a tubing head valve 13, a production flanged cross 14, a tubing wing valve 15, a master tubing valve 16, a tubing head 17, a plurality of casing wing valves 18, a flange 19 welded to the upper end of an inner casing 20, a plurality of casing head valves 21, a casing head 22 for an outer casing 23, an intermediate casing 24, and an inner tube 25.

When it becomes necessary to treat the inner surfaces of the tubing, several problems are imposed. Of especial importance are: the annular space between the casing 20 and the tube 25 is blocked by a packer, not shown, and therefore the reagent cannot be introduced through the annular space as in the case of normally completed wells. Also, wells operate at exceedingly high pressures; especially in the case of gas-condensate wells where the initial pressures are often as high as 6,000 pounds per square inch. Heretofore, two methods have been employed in attempts to overcome these difficulties. One involves the complete stopping of well production by closing the tubing with an imperforated choke below the level where treatment is desired, effecting the treatment, and then removing the imperforate choke in order to resume production. Another current process for well treating involves running a small bore tube known as "macaroni" tubing inside the tubing string to the desired level and pumping the treating reagent through the "macaroni" tubing. This method greatly interferes with well production since it greatly reduces the cross sectional area of the tubing flow string. Further disadvantages include the great difficulty of inserting the "macaroni" tubing against well pressures, and the "macaroni" tubing frequently parts near the surface because of the relatively great weight of the long length of macaroni tubing which must be employed. Both methods have the further disadvantages of being applicable only to fluid reagents; and these methods have been found to be generally expensive and uneconomical.

Accordingly, it is an object of this invention to provide apparatus for the introduction of reagents for the treating of the inner tubing walls and the bottom hole equipment and area in wells that have packers that prevent the introductions of reagents through the annular spaces surrounding the tubing and leading to the bottom hole or producing zone. It is a further object that such apparatus be adaptable to the introduction of solid, liquid and gaseous reagents. It is still another object that in employing such apparatus the well production will not be seriously interfered with. Other objects and advantages will be obvious or will appear hereinafter in the description of the drawings exemplifying the invention.

These objects and advantages are accomplished in accordance with this invention by the method for introducing a reagent into the flow string of a well while recovering fluid hydrocarbons which comprises confining said reagents in a well head magazine assembly coaxially superimposed and secured above a closed tubing head valve and flow string; said magazine assembly comprising a tubular body section the lower end of which is adapted to secure said magazine body section coaxially over the inlet of the tubing head valve, a pressure controlling means for said magazine body section, and a removable pressure confining means fitted at the upper inlet of said magazine body section; thereafter equalizing the pressure [between] *in* the magazine assembly without releasing the confined reagent, and then releasing said confined reagent into the flow string.

Figure 2:
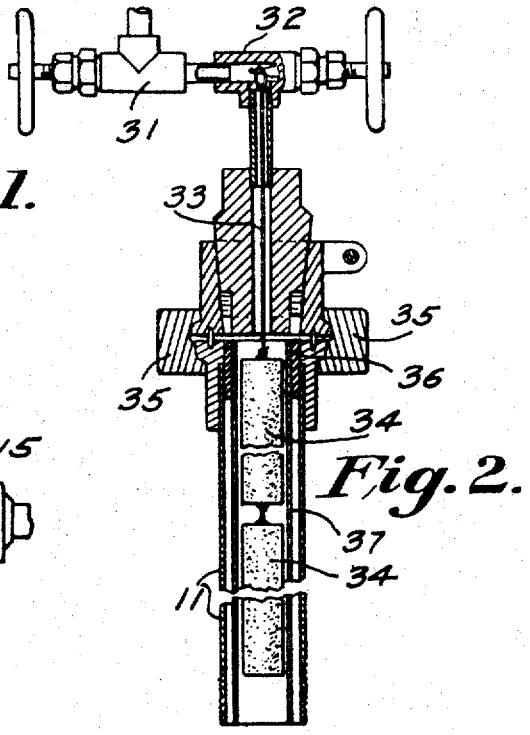
Figure 2 is an enlarged partial section of the attachment illustrated in Figure 1.

Referring to Figure 2, there is shown, in section, a novel well head magazine assembly 11 comprising a fluid regulating valve 31, a screw operated charge supporting and releasing mechanism 32, a looped suspending means 33 for a charge of reagent 34, a split *unibolt* coupling 35, a clamping rubber sleeve 36 for a tubular guide 37 for guiding the charge of reagent 34 during the initial portion of the fall of the charge.

Figure 3:
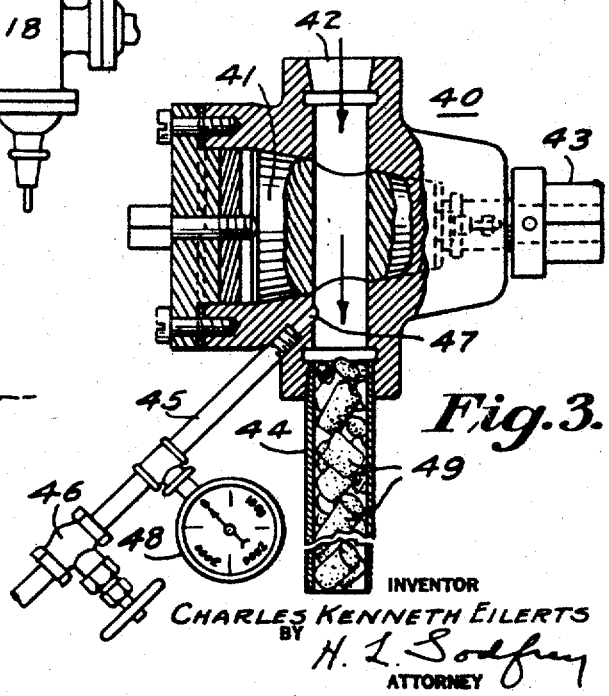
Figure 3 is an enlarged section of a preferred modification of my attachment.

Referring to Figure 3, there is shown, partly in section, another well head magazine assembly 40, comprising a high pressure plug-cock 41, having an inlet 42 and a [protruding squared end 43 and a magazine body 44. Fluid under pressure is admitted to the magazine 44 through a pipe 45, a control valve 46 and a port 47 in the valve casing below the plug of the plug-cock 41. A pressure gage 48 is operatively connected with the pipe 45 and serves to indicate by the fluctuations in pressure the progress of a charge 49 from the magazine body 44.] *valve stem head 43 which is mounted on a tubular magazine body 44. A pipe 45 connects a pressure equalizing valve 46 with a port 47 in the valve casing below the plug-cock 41 and with an intermediate pressure gage 48.*

The equipment exemplified in all figures of the drawings is to be understood as being such that it can safely withstand the pressures encountered in well operation.

The well head magazines as shown in Figures 2 and 3 are readily adapted for the introduction of solid, liquid, or gaseous reagents into the flow string of wells. When liquid or gaseous reagents are introduced, it is preferable to confine the reagent in a frangible container of such shape and size that it can enter and pass through the flow string and constructed of a material which will dissolve in the well fluids, the reagent, or blends thereof. This method is also applicable for the introduction of solid reagents, powders or finely divided crystalline forms, if the reagent is such that relatively dense, compact lumps, crystals, or other solid shapes cannot be obtained.

In operation of the well head magazine shown in Figure 2, the magazine body section [207, with the lower half of the unibolt coupling 204 attached is secured to a closed full-opening tubing head valve (102 of Figure 1) so that it is mounted in a vertical position above the christmas tree and is concentric with the axis of the tubing. The guide cylinder 206, containing the sticks of reagent or the reagent in frangible containers bound together by cord, is inserted in the body section 207, and when the suspending means 203 has been attached to the releasing mechanism 202, the coupling 204 is closed. Thereafter, the tubing head valve (102 of Figure 1) is opened and the pressure of the charged magazine and the flow string equalized. Referring again to Figure 2, the reagent is then released by screwing the threaded stem of the restraining and releasing means 202 outward to disengage it from the suspending means 203 thereby permitting the reagent to fall and enter the tubing (119 of Figure 1).]

[At times it is desired to retard the fall of the reagent during the initial period of fall or until it has entered the tubing. This can be accomplished by opening the pressure regulating valve 201 of Figure 2 before the reagent is released and thereby permitting a greater quantity of gas to flow up through the guiding means 206 and past the reagent. A rubber sleeve 205 seals the guiding means 206 within the magazine body section 207 so that for gas to fill the space in the guiding means occupied by the reagent it must flow up past the reagent. This upward flow of gas tends to retard the initial rate of fall of the reagent.]

[When magazines of the type exemplified by Figure 3 are employed the operation is greatly simplified. The magazines can be left on the christmas tree at all times and the charging of the magazine is greatly simplified. In operation of the well head magazine of the type shown in Figure 3, the entire magazine assembly is secured coaxially above the closed tubing head valve. To charge the plug 302 is opened by operating the valve stem 303 and the reagent—preferably in the form of lumps, sticks, or cylindrical frangible containers is then introduced through the inlet 301. Thereafter, the plug 302 is closed by means of valve stem 303. Then with the pressure regulating valve 306 in the closed position, the tubing head valve is cracked slightly to permit the pressure to equalize between the tubing flow string and the magazine body chamber 304. Thereafter, the tubing head valve is opened completely to permit the reagent to enter the flow string. The initial rate of fall of the reagent can be controlled as in the other magazines by permitting the well fluids to flow rapidly past the falling reagent. This can be accomplished by opening the pressure regulating valve 306] *11, with the lower half of the split coupling 35 attached, is secured to a closed full opening tubing head valve 13 (Figure 1) so that it is mounted in a vertical position above the christmas tree and is con-*

*centric with the axis of the tubing. The guide cylinder 37, containing the sticks of reagent or the reagent in frangible containers connected by cords, is inserted in the body section 11, and when the suspending means 33 has been attached to the releasing mechanism 32, the parts are clamped together by means of the coupling 35. Thereafter, the tubing head valve 13 (Figure 1) is opened and the pressure of the charged magazine and the flow string equalized. Referring again to Figure 2, the reagent is then released by screwing the threaded stem of the restraining and releasing means 32 outward to disengage it from the suspending means 33, thereby permitting the reagent to fall and enter the inner tubing 25 (Figure 1).*

*At times it is desired to retard the fall of the reagent during the initial period of fall or until it has entered the tubing. This can be accomplished by opening the pressure regulating valve 31 (Figure 2) before the reagent is released and thereby permitting a greater quantity of gas to flow up through the tubular guide cylinder 37 and past the reagent. A rubber sleeve 36 seals the guide cylinder 37 within the magazine body section 11 so that for gas to fill the space in the guide cylinder 37 which is occupied by the reagent, it must flow up past the reagent. This upward flow of gas tends to retard the initial rate of fall of the reagent.*

*When magazines of the type exemplified by Figure 3 are employed, the operation is greatly simplified. The magazines can be left on the christmas tree at all times. The entire magazine assembly is secured coaxially above the closed tubing head valve 13. To charge, the plug 41 is opened by operating the valve stem head 43 of the plug cock 41 and the reagent—preferably in the form of lumps, sticks or in cylindrical frangible containers is then introduced through the inlet 42. Thereafter the charge plug cock 41 is closed by means of the valve stem head 43. Then, with the pressure regulating valve 46 in the closed position, the tubing valve 13 is cracked slightly to permit the pressure to equalize between the tubing flow string and the magazine body chamber 44. Thereafter, the tubing head valve is opened completely to permit the reagent to enter the flow string. The initial rate of fall of the reagent can be controlled as in the other magazines by permitting the well fluids to flow rapidly past the falling reagent. This can be accomplished by opening the normally closed pressure regulating valve 46* prior to releasing the reagent by opening the tubing head valve 13.

In gas condensate wells the sections of the tubing which are subject to corrosion often are at a point above the bottom-hole and commonly occur at the point where liquids being to condense from the hot gas. In such instances it is possible to have a constriction in the tubing at a point slightly below the condensation level or other area particularly designed to be treated. This construction will stop the fall of the reagent and permit it to blend with the fluids flowing upward through the tubing thereby treating the tubing surfaces. [Referring to Figure 1 there is shown as 122 a choke which can be set in the tubing at only desired level and which satisfactorily accomplishes this function of arresting the reagent and] *A choke, (not illustrated) may be lowered to any desired level in the inner tube 25 for arresting the descent of the reagent while* permitting the well fluid to pass upward through the tubing flow string.

By this invention it has been possible to introduce a reagent in the form of cast sticks of sodium chromate about 8 inches long and 1⅛ inches in diameter and weighing about 0.6 pound, into gas condensate wells producing fluids at a maximum mean fluid velocity of about 20 feet per second.

The shape of the reagent particle, its density, the density of the flowing fluid, and the diameter of the tubing are considered important factors limiting the fluid flow rate against which reagents can be introduced into the flow string. When it is found that the mean fluid velocity of the well fluids is too great to permit the introduction of the selected reagent it is possible to reduce the well fluid flow rate while the reagent is being introduced without greatly affecting the total well production. This can be accomplished by throttling down on the tubing wing valve prior to opening the tubing head valve and releasing the reagent.

An article by the inventor entitled "Sodium chromate effective in combating corrosion in gas wells" in the Oil and Gas Journal of May 18, 1946 (page 124) described some early testing of a well head magazine as a means for introducing reagents.

As shown in the foregoing description and drawings, an apparatus for introducing reagents into wells without appreciably diminishing well production has been provided.

Since many widely differing embodiments of the invention will occur to one skilled in the art, the invention is not limited to the specific details illustrated and described, and various changes can be made therein without departing from the spirit and scope thereof.

What is claimed is:

1. In a producing well having an assembly of equipment including a *casing head, a* christmas tree for maintaining the well under pressure, a tubular conduit extending into the well *through* and above the casing head, [and having] a flow controlling *tubing head* valve *in the tubular conduit* [intermediate its length and] [positioned] above the casing head *operable to open or close the bore of said tubular conduit,* a device secured to the upper end of the tubular conduit for the introduction of reagents into the well, while maintaining well production during treatment, said device comprising a connecting section of tubing which forms a charging magazine for a reagent secured to the upper end of the tubular conduit *opening into said conduit* and a [main] *plug cock* valve secured to the upper end of the section of tubing operable to *permit introduction of* [introduce] reagents into said magazine through a passage in said [main] *plug cock* valve, a [fluid injecting] *pressure equalizing* pipe [terminating in] *operably connected at one end with an outlet in the housing of said plug cock valve below the plug of* [*extending from* a discharge port *below*] *said valve,* [into said connecting section of tubing below said main valve], a pressure [regulating] *equalizing* valve in said [injection] pipe [for admitting fluid under pressure through said injecting pipe] and a pressure gage operably connected in said pipe between said [regulating] *equalizing* valve and *other end of said pipe* [said discharge port], whereby a charge of reagent may be passed by gravity through said open [main] *plug cock* valve into said charging magazine and, upon first closing said [main] *plug cock* valve and thereafter opening [said pressure regulating] *the tubing head* valve [and]

*with* said [flow controlling] *equalizing* valve [in said tubular conduit] *closed,* said charge of reagents may [be projected] *pass* downwardly into said tubular conduit for dissolving obstructing incrustations therein.

2. In a producing well having an assembly of equipment including a *casing head, a* christmas tree for maintaining the well under pressure, a tubular conduit extending into the well *through* and above the casing head and having a flow controlling valve intermediate its length and positioned above the casing head *operable to either open or close the bore of the tubular conduit,* an improved attachment which is secured to the upper end of the tubular conduit *and operable* for the introduction of reagents into the well, while maintaining well production during treatment, said [device] *attachment* comprising a section of tubing operably connected with *and opening into* said tubular conduit and providing a holding magazine for a charge of a reagent, a pressure regulating valve and a screw operated charge support on the upper end of said section of tubing for releasably supporting [a container containing] a charge of reagent *in a container* in said magazine, whereby by turning said charge support in one direction *a charge of reagent* in said container is released [and opening said regulating valve to introduce fluid pressure into the magazine, a charge of solvent may be forcibly projected] *and dropped* into said well casing for eliminating obstructing incrustations [within said well casing].

CHARLES KENNETH EILERTS.

REFERENCES CITED

The following references are of record in the file of this patent or the original patent:

UNITED STATES PATENTS

| Number | Name | Date |
|---|---|---|
| Re. 20,546 | Otis | Nov. 2, 1937 |
| 1,090,673 | Beecher | Mar. 17, 1914 |
| 1,817,201 | Minor | Aug. 4, 1931 |
| 1,849,190 | Jackson | Mar. 15, 1932 |
| 1,873,084 | Walker | Aug. 23, 1932 |
| 2,202,192 | Cypher | May 28, 1940 |
| 2,228,629 | Jarrell | Jan. 14, 1941 |
| 2,261,440 | Layne | Nov. 4, 1941 |
| 2,336,977 | Bean et al. | Dec. 14, 1943 |
| 2,352,805 | Scheuermann et al. | July 4, 1944 |
| 2,411,044 | Landrum et al. | Nov. 12, 1946 |
| 2,482,455 | Bailey | Sept. 20, 1949 |